(12) United States Patent
Schmid et al.

(10) Patent No.: US 6,532,791 B2
(45) Date of Patent: Mar. 18, 2003

(54) METHOD FOR INCREASING THE POSITIONING ACCURACY OF AN ELEMENT WHICH IS MOVABLY ARRANGED RELATIVE TO A STATOR

(75) Inventors: Kuno Schmid, Winterthur (CH); Daniel Ausderau, Zürich (CH); Marco Hitz, Tafers (CH); Ronald Rohner, Rudolfstetten (CH)

(73) Assignee: NTI AG, Zurich (CH)

( * ) Notice: Subject to any disclaimer, the term of this patent is extended or adjusted under 35 U.S.C. 154(b) by 0 days.

(21) Appl. No.: 09/970,039

(22) Filed: Oct. 1, 2001

(65) Prior Publication Data

US 2002/0049553 A1 Apr. 25, 2002

(30) Foreign Application Priority Data

Oct. 4, 2000 (EP) .............................. 00810916

(51) Int. Cl.[7] .............................. G01B 7/00; G01D 5/12
(52) U.S. Cl. .................. 73/1.79; 73/865.9; 324/202; 324/207.12; 324/207.15; 324/207.24; 702/94
(58) Field of Search .............................. 73/865.9, 1.79, 73/158; 324/207.11, 207.26, 202, 206; 702/94

(56) References Cited

U.S. PATENT DOCUMENTS

| 4,462,083 A | * | 7/1984 | Schwefel ...................... 702/94 |
| 4,652,821 A | * | 3/1987 | Kreft ........................ 324/207.13 |
| 4,698,996 A | * | 10/1987 | Kreft et al. .................. 324/202 |
| 5,489,845 A | | 2/1996 | Weber et al. ............ 324/207.25 |
| 5,530,303 A | | 6/1996 | Takei ............................ 310/12 |
| 5,627,466 A | * | 5/1997 | Spies et al. ............. 324/207.12 |
| 6,097,183 A | * | 8/2000 | Goetz et al. ............ 324/207.12 |

FOREIGN PATENT DOCUMENTS

| DE | 38 29 405 | 3/1990 | ............ G05D/3/20 |
| EP | 0590384 | 4/1994 | ............ G05D/3/12 |

\* cited by examiner

*Primary Examiner*—Daniel S. Larkin
*Assistant Examiner*—David Rogers
(74) *Attorney, Agent, or Firm*—Townsend and Townsend and Crew LLP

(57) ABSTRACT

The invention relates to a method for increasing the positioning accuracy of an element (13) which is movably arranged relative to a stator (10). At least two sensors (11, 12) are provided in the stator (10), a first sensor (11) and a second sensor (12), which are arranged at a distance (a) from one another in the stator (10), with respect to the movement direction (P) of the movably arranged element (13). The element (13) which is arranged such that it can move relative to the stator (10) is provided with encoders (130) which can move together with the movable element (13) and, when the element (13) carries out a movement relative to the stator (10), firstly produce a sensor signal (S11) in the first sensor (11) and then, as the movement of the element progresses, produce a sensor signal (S12) in the second sensor (12). First of all, in a calibration run, the movable element (13) is moved over the entire possible range of movement. During this movement, the sensor signals (S11, S12) of the first sensor (11) and of the second sensor (12) as well as the associated nominal positions of the movable element (13) are detected. The spatial distance (A) is then determined which corresponds to two sensor signals (S11, S12), which are of equal magnitude, follow one another and are caused by the same encoder, of the first sensor (11) and of the second sensor (12). The error (F) of the nominal position of the movable element is then determined from the spatial distance (A) determined in this way, from the actual distance (a) between the sensors and from the associated nominal positions, and is taken into account in the positioning of the movable element (13).

8 Claims, 3 Drawing Sheets

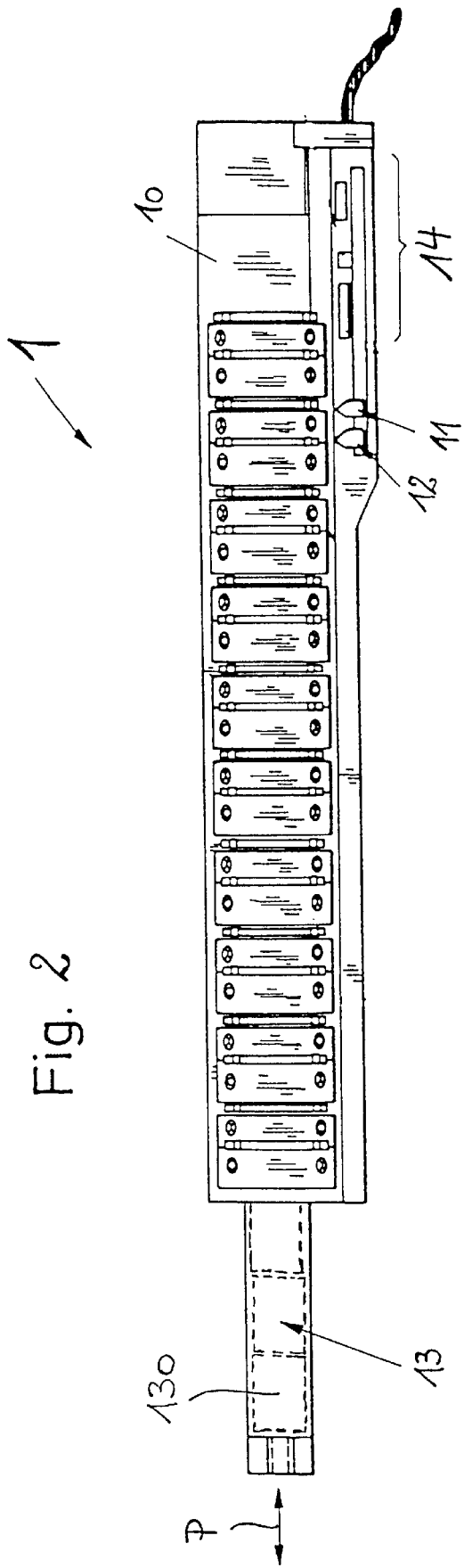

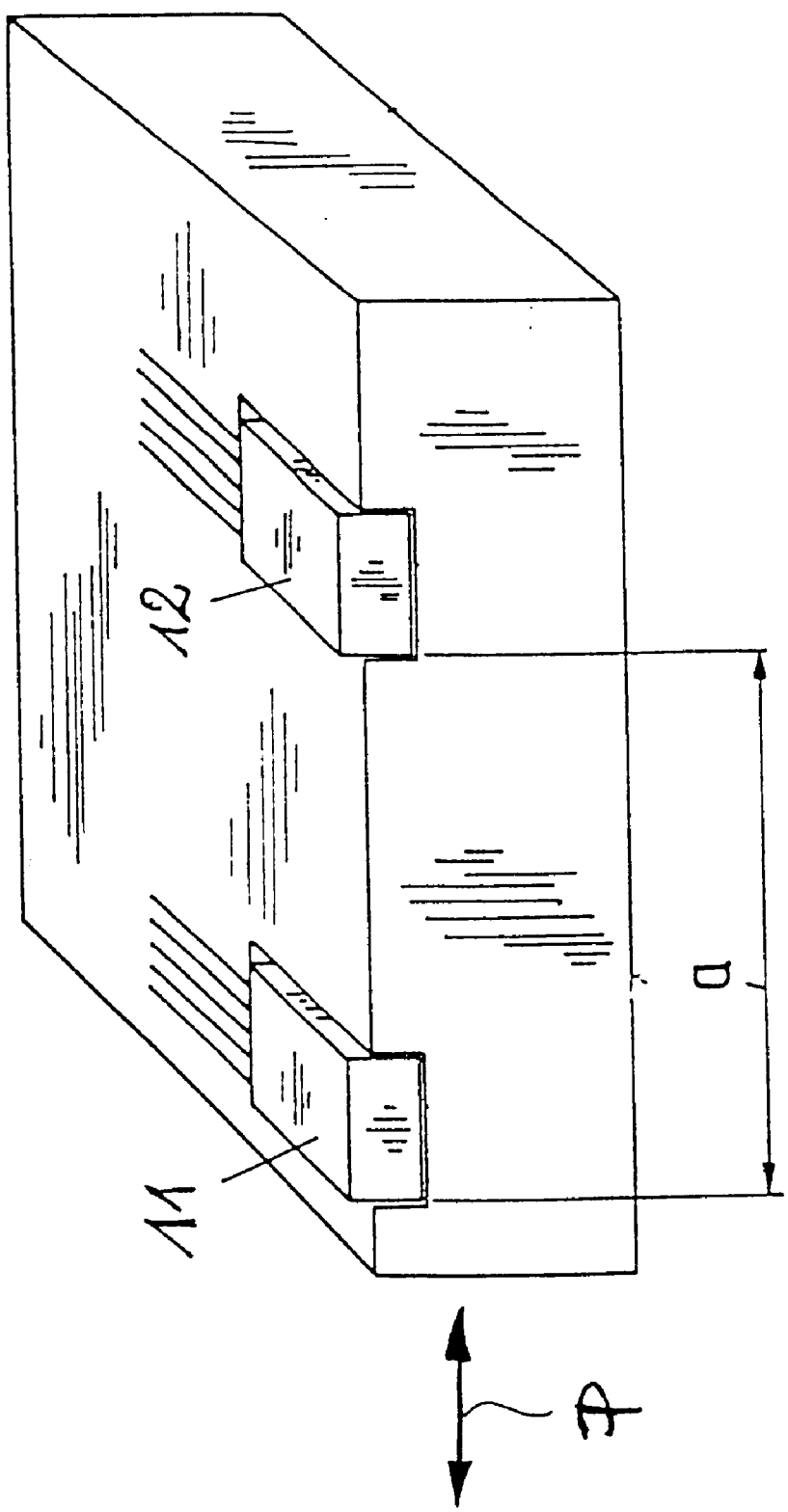

METHOD FOR INCREASING THE POSITIONING ACCURACY OF AN ELEMENT WHICH IS MOVABLY ARRANGED RELATIVE TO A STATOR

The invention relates to a method for increasing the positioning accuracy of an element which is movably arranged relative to a stator, as claimed in the preamble of the independent patent claim.

In many fields of application, there is a need to be able to accurately position a moving element which can move relative to a stationary part—a stator. In motors, in particular in linear motors, many fields of use require the capability to move the armature to a specific position with high accuracy. This requirement for high positioning accuracy contrasts with the manufacturing tolerances of the individual components, in the quoted example of a linear motor; these being the manufacturing tolerances on the stator side and the manufacturing tolerances for the armature and for its components.

While the manufacturing tolerances on the stator side can still be measured relatively well and can be taken into account in an appropriate manner, for example in the processor or electronics of the linear motor, this is feasible only with very major effort in the case, for example, of inhomogeneously magnetized magnets in the armature—if at all. Frequently, however, the errors between the position of the armature and the nominal position, which are caused by inhomogeneous magnetization of the individual magnets in the armature, are considerably more dominant than those which are caused by the manufacturing tolerances in the stator, and the tolerances on the stator side can in any case actually be measured and compensated for.

Figure 1:
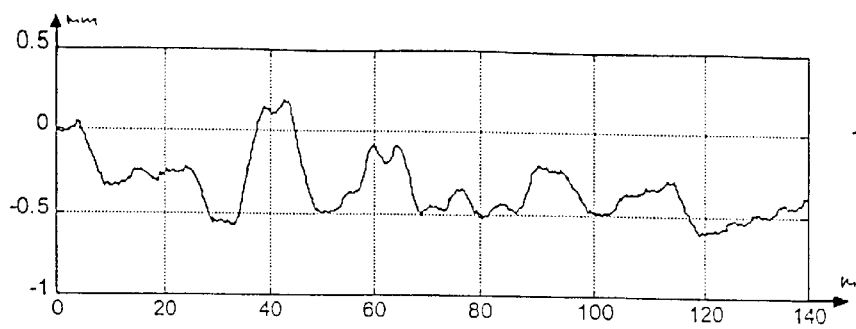

FIG. 1 shows an illustration of an example of the profile of the error between the actual position of the armature of a linear motor and its nominal position in the form of a graph, with the error between the actual position of the armature and its nominal position being plotted on the ordinate, and the nominal position of the armature being plotted on the abscissa. In this example, it can be seen that the errors in the actual position of the armature in some cases amount to more than 0.5 mm in the region of a nominal position of 30 mm (that is to say the armature has moved through about 30 mm), and in the nominal position range around about 120 mm. In general, it can be seen from this example that the error between the actual position of the armature and its nominal position may be quite considerable, especially if one considers the fact that, in certain fields of operation, linear motors are in some cases required to have a positioning accuracy which allows a typical error of only 0.1 mm.

Thus, even if it were possible to measure the specific error from the nominal position for each linear motor and for each position of the armature, possibly in some very complex manner, in order to allow subsequent compensation during operation, this procedure would nevertheless be completely unsuitable for practical use.

The invention is intended to overcome this and to propose a method by means of which—in the case of a linear motor—the position error of the armature can be determined in a simple manner. In general terms, it should be possible to determine the position error of the movable element in a simple way.

With regard to the method, this object is achieved by the features of the independent method claim. Particularly advantageous variants result from the features of the dependent method claims. With regard to the apparatus, the object is achieved by the features of the independent apparatus claim, and particularly advantageous developments can be found in the features of the dependent apparatus claims.

Figure 4:
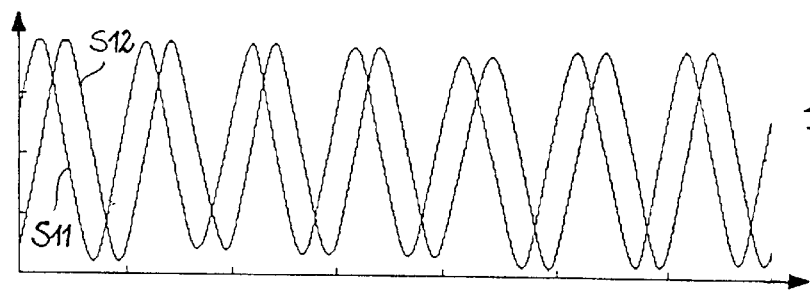
Figure 5:
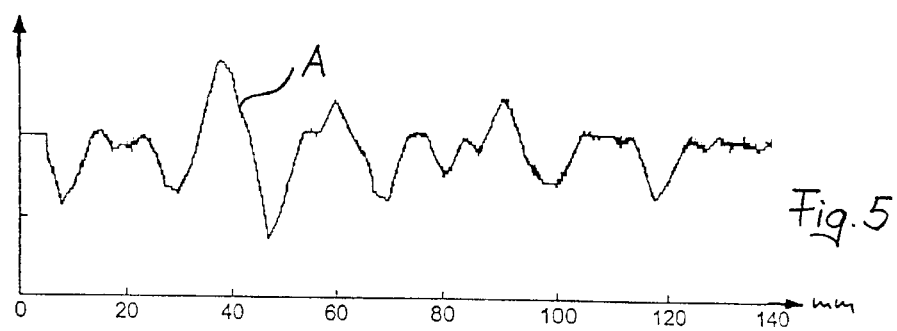
Figure 6:
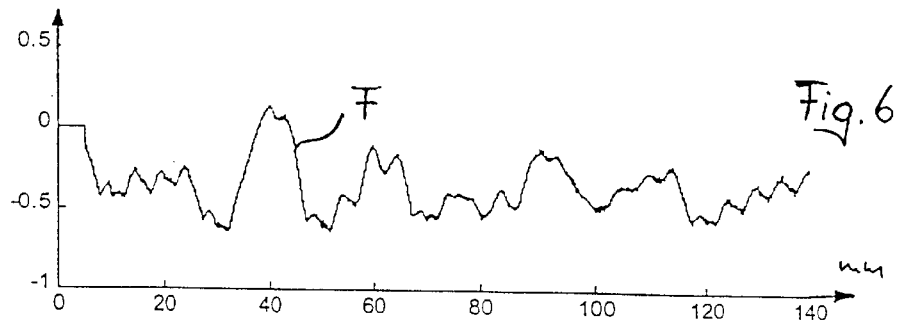
Figure 7:
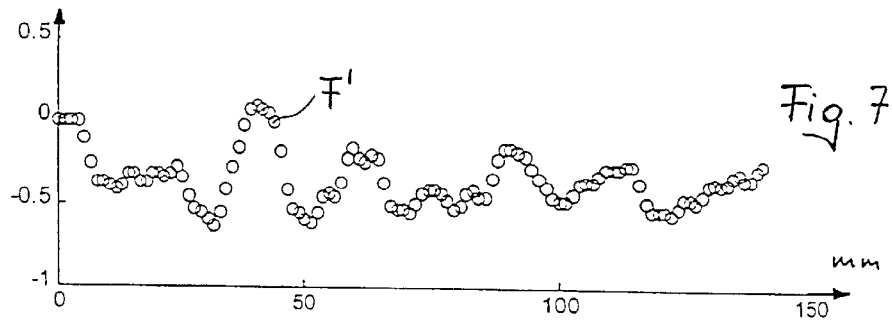

The invention will be explained in more detail in the following specification with reference to the drawings, in which, illustrated schematically:

FIG. 1 shows an example of the error between the actual position of the armature of a linear motor and its nominal position, FIG. 2 shows an exemplary embodiment of a linear motor, FIG. 3 shows a detail of the stator of a linear motor with two sensors for detection of the position of the armature, FIG. 4 shows the profile of the sensor signals, FIG. 5 shows the profile of the spatial distance corresponding to two sensor signals which are of equal magnitude, follow one another and are produced by the same encoder, FIG. 6 shows the profile of the nominal position error determined on the basis of the method according to the invention (error between the nominal position and the actual position) and FIG. 7 shows the profile of the nominal position error from FIG. 6, but with only a specific number of discrete values being stored.

The case described below considers the relationships in a linear motor as an exemplary embodiment of the method according to the invention, but without in the process wishing to limit the field of application to linear motors. The method can likewise be used, for example, with rotating motors and, in general, for apparatuses or systems in which a movable element with encoders is moved relative to a stator (stationary equipment part), with sensors for detection of the position of the movable element being arranged in the stator.

As already explained in the introduction, FIG. 1 shows the actual profile of the position error, that is to say the error between the actual position of the armature of a linear motor and its nominal position, which is output, for example, by a display of the linear motor. The position error illustrated in FIG. 1 has not been determined using the method according to the invention (but has been measured, for example).

Fundamentally, the present invention relates to this actual error, which is present in every linear motor but has a specific profile for each linear motor, being determined as accurately as possible in a simple manner—and not just by carrying out measurements with a major level of effort—in a calibration run before the start of operation, and then taking this into account for the positioning of the armature during operation, so that these motor-specific errors can be compensated for as well as possible, thus making it possible to ensure the high accuracy required for the positioning of the armature in some linear motor applications.

FIG. 2 shows a highly simplified illustration of a linear motor 1 in which, apart from the stator 10, the sensors 11 and 12 for determination of the position of the armature 13 can also be seen, as well as an electronics device 14. The permanent magnets 130 of the armature 13 are in this case just indicated by dashed lines, but they represent the encoders which produce appropriate signals in the sensors 11 and 12 during movement of the armature 13. The sensors 11 and 12 may be, for example, in the form of Hall sensors.

FIG. 3 shows a detail of a stator to show how the sensors 11 and 12, for example, are arranged, namely at a distance a from one another. If the armature is now moved with its permanent magnets (not shown in FIG. 3) past the sensors 11 and 12 in the direction of the arrows P, as is the situation when the armature moves in and out, then corresponding sensor signals are produced in the sensors 11 and 12.

By way of example, FIG. 4 shows such a profile of the sensor signals S11 and S12 for the sensors 11 and 12. The sensor signals have no offset (since this has already been compensated for if necessary), and have the same amplitude. Furthermore, it can be seen that the sensor signals S11 and S12 have a periodic profile approximately in the form of a sine-wave or cosine-wave, although this is not an essential precondition for the method according to the invention.

Since the sensors 11 and 12 in the stator are arranged at a fixed distance a from one another (FIG. 3), the two curves which represent the profile of the sensor signals S11 and S12 also run at a fixed distance relative to one another, which corresponds to this distance a between the two sensors 11 and 12. With respect to the nominal position, that is to say that position which the electronics for the linear motor "believe" to be the actual position of the armature, the distance between the two sensor signals is, however, not constant, although this cannot be seen directly from FIG. 4. In fact, this error may vary—depending on the distance through which the armature has moved. This can then be seen in FIG. 5.

FIG. 5 shows the spatial distance A which corresponds to two sensor signals, which are of equal magnitude and follow one another, of the first sensor 11 and of the second sensor 12. It can be seen that this distance A varies, that is to say it is dependent on the nominal position of the armature. The profile of the curve illustrated in FIG. 5 can be explained as follows: if one starts from the nominal position zero (when the armature is at the zero position), then a very specific encoder in this nominal position excites the sensor signal S11 (FIG. 4) in the first sensor 11 (FIG. 3). If the armature now moves away from the zero position, then it must first of all travel through a specific distance before that particular sensor produces a sensor signal S12 of the same magnitude in the second sensor 12 (FIG. 3) as that which it produced in the first sensor 11 when the armature was at the zero position. Until the armature has moved at least through this distance away from the zero position, it is also impossible to determine the distance A between two sensor signals of the same magnitude, since the sensor signal S12 of the second sensor has not yet even reached the value which the encoder produced in the first sensor 11 when the armature was at the zero position. For this region—that is to say for the region before the armature has moved sufficiently far from the zero position for the second sensor 12 to have a sensor signal of equal magnitude as the first sensor 11 at the zero position—it is assumed that the distance A is as great as the actual distance a between the two sensors 11 and 12 in the stator, which is actually known from the design or can be measured (in other words, an error of zero is assumed for this region, or the error in this region is cleaned up by using other methods).

FIG. 6 now shows the profile of the position error F as is determined using the method according to the invention and after completion of the calibration run, with the actual positioning of the armature being taken into account. It can be seen in FIG. 6 that the error F initially remains at zero (it is simply assumed to be zero, as explained above) until the armature has moved sufficiently far away from the zero position for the sensor signal S12 of the second sensor 12 (FIG. 3) to be of equal magnitude to the sensor signal S11 of the first sensor 11 (FIG. 3) when the armature is at the zero position.

After this, the error F is obtained—starting from the zero position of the armature when moving out—as follows: as soon as the sensor signal S12 of the second sensor 12 has the same magnitude as the sensor signal S11 when the armature was at the zero position, the distance A is determined. This distance A is nothing more than the difference between the first nominal position (in this case the zero position) and the second nominal position (this is that position which the electronics "believe" the armature is actually located at in this position). In order to allow the position error of the armature at this second position (this is that position in which the sensor signal S12 of the sensor 12 is of equal magnitude to the sensor signal S11 when the armature was at the zero position) now to be determined, the error in the first position—in this case the zero position—must be known in addition to the distance A. However, this error is initially assumed to be zero. Based on this assumption, the position error of the armature at the second position is obtained from the difference between the distance A (this is the difference between the two positions which the electronics device outputs as the armature positions) and the actual distance a (FIG. 3) between the sensors 11 and 12.

However, in general, the error at the second position of the armature is determined by first of all determining the error at the associated first position of the armature (this is that position at which the immediately preceding sensor signal S11, produced by the same encoder, of the first sensor 11 was of the same magnitude as the sensor signal S12 of the second sensor 12 at the second position). If this error at the first position is known, then the difference between the distance A and the actual distance a between the sensors 11 and 12 is added to this error. The error at the second position of the armature is then obtained in this way. If this is done successively for all the "second" positions of the armature, this results in the profile of the error F as illustrated in FIG. 6. This error F determined in this way is taken into account in the positioning of the armature once the calibration run has been completed, and this can be done, for example, by the basic software or by the respective application software.

If sufficient memory space is available, the profile of the error F can now be stored in increments which are as narrow as possible, and can be taken into account in the positioning of the armature once the calibration run has been completed. However, in practice, it is normally feasible to store only a specific number of such values for the error. The error at a nominal position between two positions for which the error is stored is then obtained, for example, by interpolation. FIG. 7 shows how this may appear if only a specific number of such values for the error are stored, with the profile of the error F in FIG. 6 being essentially in "sample" form F'.

In a further embodiment variant, the error at the first position of the armature (this is the position at which the sensor signal S11 of the first sensor 11 is of equal magnitude to the sensor signal S12 of the second sensor S12 at the point at which the error is intended to be determined) can be weighted, for example by a factor of 0.75. This allows any tendency of the error F to oscillate, in response to spurious results (minor interference) in sensor signal detection, to be reduced or suppressed. The method for determining the error thus becomes more stable.

In yet another variant, when determining the distance A, an interpolation is carried out between the preceding value and the next value of the distance A if the gradient of the sensor signal is less than a value which can be predetermined (in other words, when the signal profile is too flat). This avoids an inaccurate association being produced between the sensor signal and the associated nominal position in areas in which the sensor signal has a very flat profile, thus possibly resulting in greater "corruption" than from interpolation.

As has already been mentioned further back in the specification, the application of the method is not restricted just to linear motors, but is generally suitable for apparatuses in which a movable element can move relative to a stator (stationary element) and it is necessary to be able to determine its position accurately. There is also no need whatsoever for the encoders to be magnetic and, in a corresponding manner, the sensors do not necessarily need to be magnetic field sensors either, but may, for example, also be based on optical or mechanical principles. This is typically the case only in the linear motor application. The method is also suitable, for example, for rotating systems (for example for systems which require very accurate positioning of the rotor). With regard to the sensors with which the position error is determined during the calibration run, these may be the same sensors which will later be used—once the calibration has been carried out—during operation of the linear motor as position sensors for determination of the position of the armature, although separate calibration sensors may also be used. The calibration may also be carried out during operation, or may be readjusted in the meantime.

What is claimed is:

1. A method for increasing the positioning accuracy of an element (13) which is movably arranged relative to a stator (10), with at least two sensors (11, 12) being provided in the stator (10), a first sensor (11) and a second sensor (12), which are arranged at a distance (a) from one another in the stator (10), with respect to the movement direction (P) of the movably arranged element (13), and with the relative to the stator (10) movably arranged element (13) being provided with encoders (130) which can move together with the movable element (13) and, when the element (13) carries out a movement relative to the stator (10), firstly produce a sensor signal (S11) in the first sensor (11) and then, as the movement of the element progresses, produce a sensor signal (S12) in the second sensor (12), wherein, first of all, in a calibration run, the movable element (13) is moved over the entire possible range of movement and, during this movement, the sensor signals (S11, S12) of the first sensor (11) and of the second sensor (12) as well as the associated nominal positions of the movable element (13) are detected, wherein the spatial distance (A) is then determined which corresponds to two sensor signals (S11, S12), which are of equal magnitude, follow one another and are caused by the same encoder, of the first sensor (11) and of the second sensor (12), and wherein the error (F) of the nominal position of the movable element is then determined from the spatial distance (A) determined in this way, from the actual distance between the sensors (a) and from the associated nominal positions, and is taken into account in the positioning of the movable element (13).

2. The method according to claim 1, in which the determination of the error (F) is carried out at a specific nominal position of the movable element (13), in such a manner that the sensor signal (S12) of the second sensor (12) is read at that specific nominal position, that the nominal position at which the first sensor (11) has an immediately preceding sensor signal (S11) of equal magnitude is then read, the position error (F) of the armature at this nominal position is then read, and the difference between the previously determined spatial distance (A) at which the two sensors (11, 12) have a sensor signal (S11, S12) of equal magnitude and the actual distance (a) between the sensors (11, 12) is then added to this position error (F).

3. The method according to claim 2, in which the position error is weighted at that nominal position at which the first sensor (11) has a sensor signal (S11) of equal magnitude to that at the specific nominal position.

4. The method according to claim 1, in which, if the magnitude of the gradient of the sensor signals (S11, S12) is less than a value which can be predetermined, an interpolation between the preceding value and the next value for the distance (A) is carried out rather than determining the spatial distance (A).

5. The method according to claim 1, in which the actual error (F) of the nominal position of the movable element (13) is not stored in a memory for each individual nominal position, but only for a specific number of nominal positions, and wherein an interpolation is carried out when the error is required for a nominal position which is located between two nominal positions which are stored in the memory.

6. An apparatus having a stator (10) and an element (13) movable relative to this stator (10), with at least two sensors (11, 12) being provided in the stator (10), a first sensor (11) and a second sensor (12), which are arranged at a distance (a) from one another in the stator, with respect to the movement direction (P) of the movable element, and with the element (13) movable relative to the stator being provided with encoders (130) which can move together with the movable element (13) and, when the element (13) carries out a movement relative to the stator (10), firstly produce a sensor signal (S11) in the first sensor (11) and then, as the movement of the element progresses, produce a sensor signal (S12) in the second sensor (12), wherein means (14) are provided for detection of the sensor signals (S11, S12) of the first sensor (11) and of the second sensor (12) as well as of the associated nominal positions of the movable element (13), and for determination of the spatial distance (A) which corresponds to two sensor signals (S11, S12), which are of equal magnitude and follow one another, of the first sensor (11) and of the second sensor (12), and wherein means (14) are provided which then determine the error (F) of the nominal position of the movable element (13) from the spatial distance (A) determined in this way, from the actual distance between the sensors (a) and from the associated nominal positions, and take this into account in the positioning of the movable element (13).

7. The apparatus according to claim 6, which comprises a linear motor (1) with a stator (10) and an armature (13), and in which the encoders are arranged as permanent magnets (130) in the armature, and the sensors (11, 12) which are arranged in the stator (10) are in the form of magnetic field sensors, in particular Hall sensors, and in which the means for detection of the sensor signals and of the associated nominal positions are provided in an electronics device (14), in the same way as the means which determine the spatial distance (A) and which then determine the error (F) of the nominal position and take this into account in the positioning of the armature (13).

8. The apparatus according to claim 7, in which the means (14) for detection of the sensor signals (S11, S12) and the associated nominal positions are provided in the basic software and/or in the application software in the electronics device (14) in the same way as the means (14) which determine the spatial distance (A) and which then determine the error (F) of the nominal position and take this into account in the positioning of the armature (13).

* * * * *